(12) United States Patent
Roskind

(10) Patent No.: US 9,098,244 B2
(45) Date of Patent: Aug. 4, 2015

(54) IGNORING TACTILE INPUT BASED ON SUBSEQUENT INPUT RECEIVED FROM KEYBOARD

(71) Applicant: Google Inc., Mountain View, CA (US)

(72) Inventor: James Roskind, Redwood City, CA (US)

(73) Assignee: Google Inc., Mountain View, CA (US)

( * ) Notice: Subject to any disclaimer, the term of this patent is extended or adjusted under 35 U.S.C. 154(b) by 108 days.

(21) Appl. No.: 13/742,030

(22) Filed: Jan. 15, 2013

(65) Prior Publication Data

US 2014/0198046 A1    Jul. 17, 2014

(51) Int. Cl.
*G06F 3/038* (2013.01)
*G06F 3/0354* (2013.01)
*G06F 1/16* (2006.01)

(52) U.S. Cl.
CPC .............. *G06F 1/1662* (2013.01); *G06F 3/038* (2013.01); *G06F 3/03547* (2013.01)

(58) Field of Classification Search
CPC ..... G06F 1/1684; G06F 1/1692; G06F 1/169; G06F 3/023; G06F 3/0213; G06F 3/0216; G06F 3/0219; G06F 3/0221; G06F 3/0227; G06F 3/0233; G06F 1/1662; G06F 1/1664; G06F 1/1666; G06F 1/1667; G06F 1/1669; G06F 1/1671; G06F 21/83; G06F 3/02; G06F 3/021; G06F 3/03; G06F 3/00; G06F 3/038; G06F 1/1643; G06F 3/03547; G08F 6/00

See application file for complete search history.

(56) References Cited

U.S. PATENT DOCUMENTS

| | | | | |
|---|---|---|---|---|
| 5,909,589 | A  * | 6/1999 | Parker et al. | 712/32 |
| 6,046,728 | A  * | 4/2000 | Hume et al. | 345/157 |
| 7,561,146 | B1 * | 7/2009 | Hotelling | 345/175 |
| 7,681,146 | B2 * | 3/2010 | Hawkins et al. | 715/816 |
| 2001/0055195 | A1 | 12/2001 | Suzuki | |
| 2003/0034185 | A1 | 2/2003 | Kaikuranta | |
| 2003/0137497 | A1 | 7/2003 | Kojo et al. | |
| 2005/0057489 | A1 | 3/2005 | Kung et al. | |
| 2006/0044259 | A1 * | 3/2006 | Hotelling et al. | 345/156 |
| 2007/0091070 | A1 * | 4/2007 | C. Larsen et al. | 345/168 |
| 2007/0097081 | A1 * | 5/2007 | Ohshita et al. | 345/168 |
| 2007/0120823 | A1 * | 5/2007 | Otsuka et al. | 345/156 |

(Continued)

FOREIGN PATENT DOCUMENTS

WO    WO 2004025449   A2  *   3/2004

OTHER PUBLICATIONS

International Search Report and Written Opinion for PCT Patent Application No. PCT/US2014/010706, mailed on Apr. 23, 2014, 10 pages.

*Primary Examiner* — Dwayne Bost
*Assistant Examiner* — Ivelisse Martinez Quiles
(74) *Attorney, Agent, or Firm* — Brake Hughes Bellermann LLP

(57) ABSTRACT

A non-transitory, computer-readable storage medium comprising instructions stored thereon. When executed by at least one processor, the instructions may be configured to cause a computer system to at least monitor for a post-tactile keyboard input within a post-tactile input threshold time after receiving a tactile input device input, ignore the tactile input device input if the post-tactile keyboard input is received within the post-tactile input threshold time after receiving the tactile input device input, and recognize the tactile input device input if the post-tactile keyboard input is not received within the post-tactile input threshold time after receiving the tactile input device input.

17 Claims, 13 Drawing Sheets

(56) References Cited

U.S. PATENT DOCUMENTS

| | | | |
|---|---|---|---|
| 2010/0156675 A1* | 6/2010 | Ganey et al. | 341/20 |
| 2011/0050576 A1* | 3/2011 | Forutanpour et al. | 345/168 |
| 2011/0291922 A1* | 12/2011 | Stewart et al. | 345/156 |
| 2011/0316774 A1* | 12/2011 | Clifton et al. | 345/157 |
| 2012/0113009 A1 | 5/2012 | Hotelling et al. | |
| 2012/0242578 A1* | 9/2012 | Laubach | 345/160 |

* cited by examiner

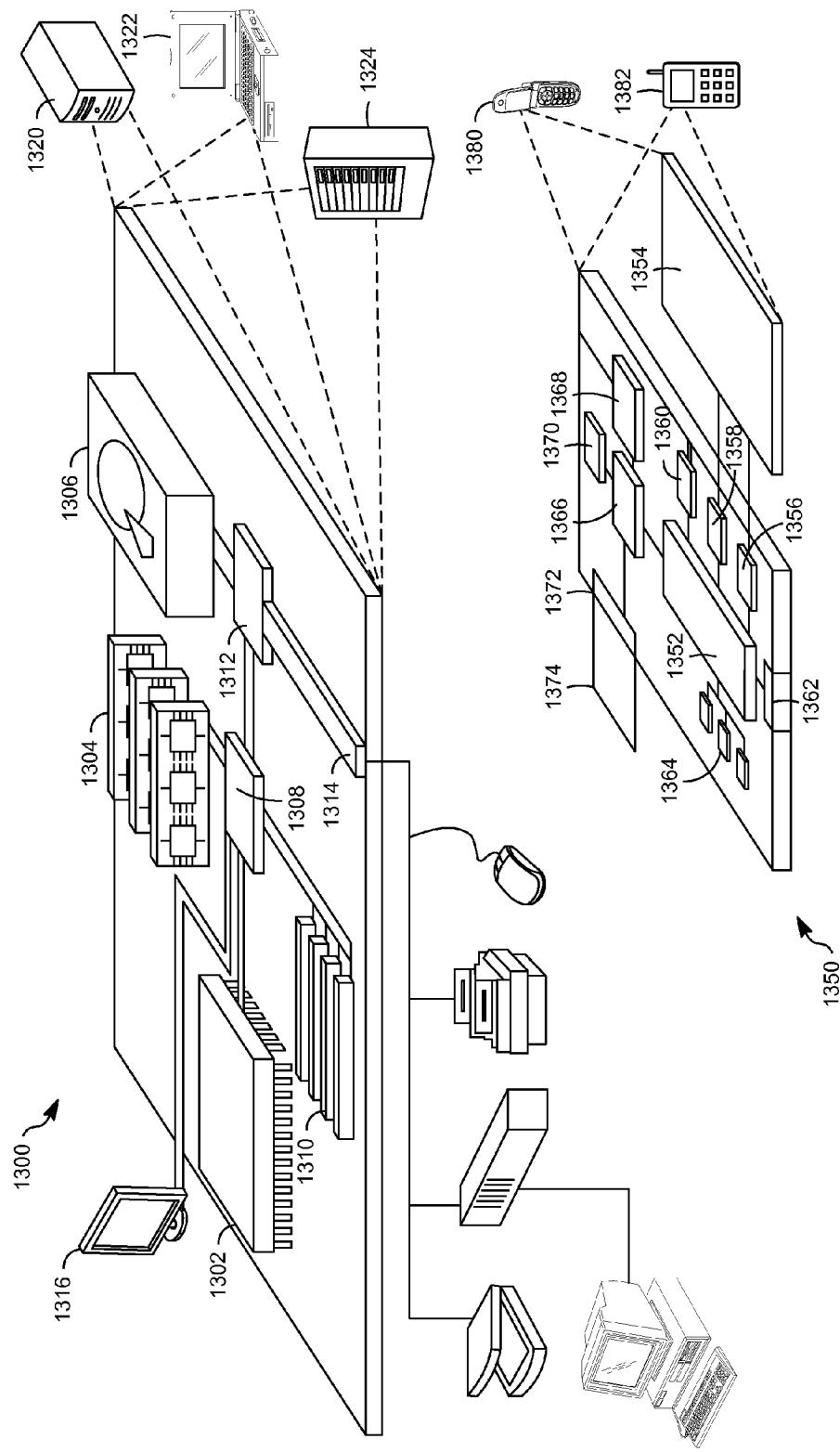

IGNORING TACTILE INPUT BASED ON SUBSEQUENT INPUT RECEIVED FROM KEYBOARD

TECHNICAL FIELD

This description relates to input devices for computers.

BACKGROUND

When a user is typing onto a computing device, such as a laptop or notebook computer, that has a tactile input device such as a trackpad or touchpad that may simulate a mouse, the user's hand, thumb, or finger may accidentally touch, slide across, and/or brush against the tactile input device. The accidental contact with the tactile input device may cause the cursor to move, resulting in subsequent typing being inserting into the wrong place in a document.

SUMMARY

According to one general aspect, a non-transitory, computer-readable storage medium comprising instructions stored thereon. When executed by at least one processor, the instructions may be configured to cause a computer system to at least monitor for a post-tactile keyboard input within a post-tactile input threshold time after receiving a tactile input device input, ignore the tactile input device input if the post-tactile keyboard input is received within the post-tactile input threshold time after receiving the tactile input device input, and recognize the tactile input device input if the post-tactile keyboard input is not received within the post-tactile input threshold time after receiving the tactile input device input.

According to another general aspect, a non-transitory, computer-readable storage medium comprising instructions stored thereon. When executed by at least one processor, the instructions may be configured to cause a computer system to receive input from a tactile input device, queue the input from the tactile input device for a post-tactile input threshold time after receiving the input from the tactile input device, determine whether a post-tactile keyboard input is received within the predetermined period of time after receiving the input from the tactile input device, if the post-tactile keyboard input is received within the post-tactile input threshold time after receiving the input from the tactile input device, ignore the queued input from the tactile input device, and if no post-tactile keyboard input is received within the post-tactile input threshold time after receiving the input from the tactile input device, recognize the queued tactile input device input.

According to another general aspect, a computer system may include a keyboard, a tactile input device, and a controller. The keyboard may be configured to receive keyboard input. The tactile input device may be configured to receive tactile input. The controller may be configured to monitor for a post-tactile keyboard input into the keyboard within a post-tactile input threshold time after receiving a tactile input device input into the tactile input device, ignore the tactile input device input if the post-tactile keyboard input is received within the post-tactile input threshold time after receiving the tactile input device input, and recognize the tactile input device input if the keyboard input is not received within the post-tactile input threshold time after receiving the tactile input device input.

The details of one or more implementations are set forth in the accompanying drawings and the description below. Other features will be apparent from the description and drawings, and from the claims.

BRIEF DESCRIPTION OF THE DRAWINGS

FIG. 13 shows an example of a computer device that can be used to implement the techniques described here.

Like reference symbols in the various drawings indicate like elements.

DETAILED DESCRIPTION

A computing device may include input devices, such as a keyboard and a tactile input device. The keyboard may include alphanumeric keys (letters and numbers), directional keys (up, down, left, right), modifier keys (control, alter, shift), and/or function keys. The tactile input device may include, for example, a trackpad, touch pad, or touchscreen. The tactile input device may simulate mouse gestures, enabling a user to control a cursor on a screen or display of the computing device, thereby controlling a location of input by the user.

The keyboard and tactile input device may be located close to each other on the computing device to facilitate the user alternating between providing input via the keyboard and providing input via the tactile input device. While typing into the keyboard, the user may accidentally contact the tactile input device and thereafter continue typing. To prevent the cursor from moving, which may cause the subsequent typing to insert text into a wrong place in a document, the computing device may ignore the input into the tactile input device based on receiving input into the keyboard within a post-tactile input threshold time after receiving the tactile input, according to an example implementation. According to another example implementation, the computing device may ignore the tactile input based on receiving input into the keyboard within a pre-tactile input threshold time before receiving the tactile input and receiving input into the keyboard within a post-tactile input threshold time after receiving the tactile input.

Figure 1:
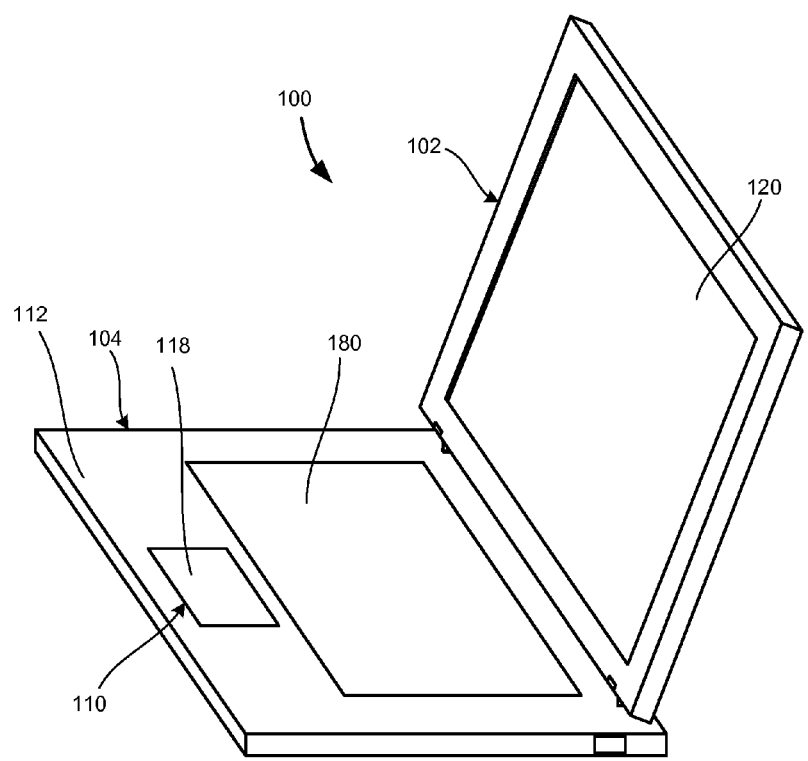
FIG. 1 shows a computing device with a keyboard and tactile input device according to an example implementation.

FIG. 1 is a diagram of a computing device 100 including a tactile input device 110 and keyboard 180 according to an example implementation. Computing device 100 includes a display portion 102 and a base portion 104. Display portion 102 may include a display 120 that can be, for example, a liquid crystal display (LCD), a light emitting diode (LED) display, or other type of electronic visual display device. The base portion 104 can include, among other components, the tactile input device 110, a housing 112, and the keyboard 180.

The tactile input device 110 can include a sensor (not shown in FIG. 1) and a top surface 118, configured to receive contacts or inputs (e.g., a touch, swipe, scroll, drag, click, hold, tap, or combination of such inputs) from a user. The sensor can be activated when a user enters an input on the top surface 118 of the tactile input device 110, and can communicate electronic signals within the computing device 100. The sensor can be, for example, a flame-retardant class-4 FR4 printed circuit board. Other components, such as a dome switch, adhesive sheets, and cables (not shown), may also be integrated in computing device 100 to process input by a user via tactile input device 110 or keyboard 180. Various elements shown in the display 120 of the computing device 100 may be updated based on various movements of contacts on the tactile input device 110 and/or the keyboard 180.

Tactile input devices, such as tactile input device 110, may be used in self-contained portable laptop computers such as device 100, and do not require a flat surface near the computer. The tactile input device 110 may be positioned close to the keyboard 180. The tactile input device 110 may use very short finger movements to move a cursor across the display 120. While advantageous, this also makes it possible for a user's thumb to move the mouse cursor accidentally while typing, or for a user to unintentionally move the cursor, for example when a finger first touches the tactile input device 110. Tactile input device functionality is also available for desktop computers in keyboards with built-in touchpads, and in mobile devices, as described in more detail below with respect to FIG. 13.

The components of the input devices (e.g., 110, 180) described here can be formed with a variety of different materials such as plastic, metal, glass, or ceramic. For example, the top surface 118 and base member 104 can each be formed, at least in part, with an insulating material and/or conductive material such as a stainless steel material, for example, SUS301 or SUS304.

Some tactile input devices have "hotspots," which are locations on the tactile input device 110 used for functionality beyond a mouse. For example, on certain tactile input devices 110, moving the finger along an edge of the tactile input device 110 may act as a scroll wheel, controlling the scrollbar and scrolling the window in a display 120 that has the focus (e.g., scrolling vertically or horizontally). Certain tactile input devices 110 may use two-finger dragging for scrolling. Additionally, some tactile input device drivers support tap zones, regions where a tap will execute a function, for example, pausing a media player or launching an application. All of these functions may be implemented in tactile input device driver software, and these functions can be modified or disabled.

Figure 2:
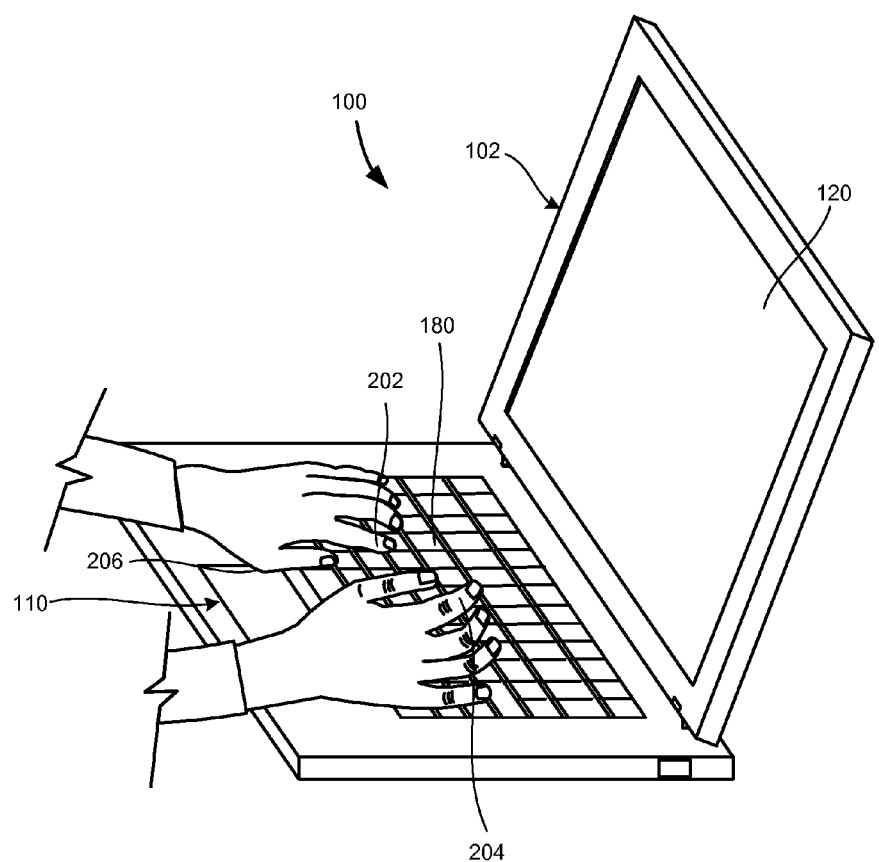
FIG. 2 shows a user typing into the keyboard of the computing device of FIG. 1 and accidentally contacting the tactile input device according to an example implementation.

FIG. 2 shows a user typing into the keyboard 180 of the computing device 100 of FIG. 1 and accidentally contacting the tactile input device 110 according to an example implementation. The user may type into the keyboard 180 using his or her fingers 202, 204. While typing into the keyboard 180, the user's thumb 206 or palm may brush the tactile input device 110. The computing device 100 may receive keyboard inputs before and/or after receiving the tactile input device input. The computing device 100 may ignore the tactile input device input based on receiving the keyboard inputs before and/or after receiving the tactile input device inputs, according to example implementations.

Figure 3:
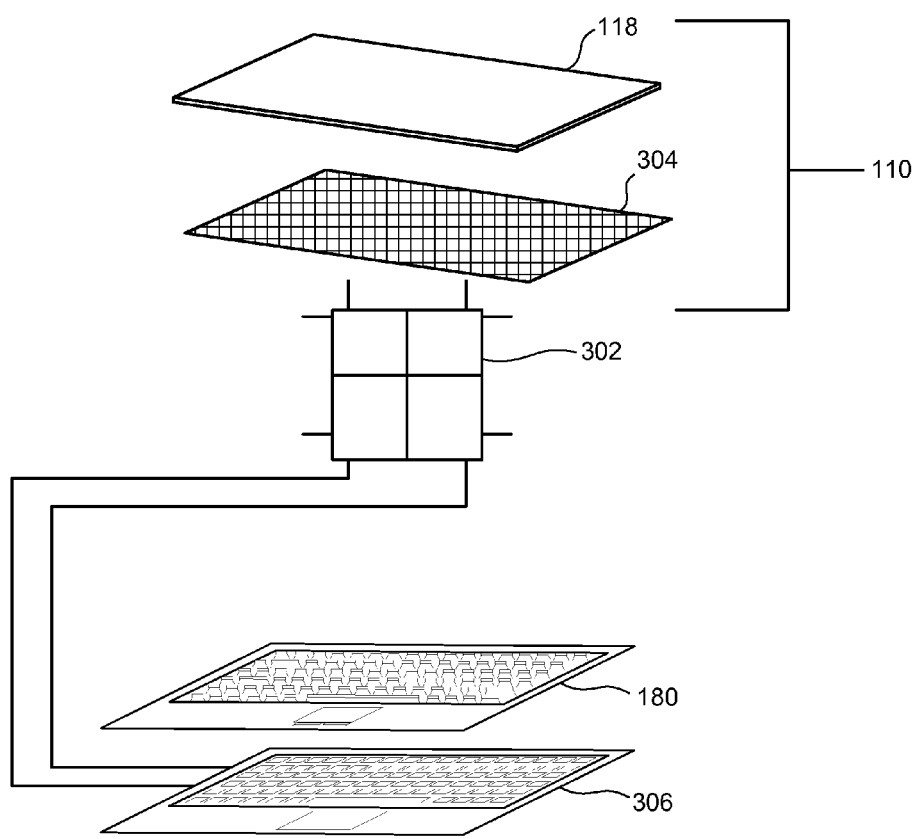
FIG. 3 shows components of the computing device according to an example implementation.

FIG. 3 shows components of the computing device 100 (shown in FIG. 1) according to an example implementation. Tactile input device 110 includes the surface 118 and a tactile sensor 304. The sensor 304 is coupled to a controller 302.

The surface 118 may be configured to be contacted by a user to actuate and trigger an electrical response within the computing device 100. The surface 118 may, for example, be on top of the tactile input device 110 and above the tactile sensor 304, parallel and flush or nearly flush with other components of the computing device 100 (shown in FIG. 1A), such as a top surface of the base portion 104. The surface 118 may be operably coupled to the tactile sensor 304. The tactile sensor 304 can be activated when a user enters an input (e.g., a touch, swipe, or a click), such as by applying pressure on the top surface 118 of the tactile input device 110. The tactile sensor 304 can be, for example, a flame-retardant class-4 (FR4) printed circuit board. The tactile sensor 304 may be responsive to applications of pressure on the surface 118 and/or tactile sensor 304, and may provide signals to the controller 302 indicating changes in resistance and/or capacitance in the tactile sensor 304 based on the applications of pressure and/or proximity of the user's skin (such as the user's finger, thumb, or palm).

Controller 302 may be operably coupled to tactile sensor 304 and a keyboard sensor 306. Controller 302 may be an embedded microcontroller chip and may include, for example, read-only firmware. Controller 302 may include a single integrated circuit containing a processor core, memory, and programmable input/output peripherals. Bus 156 may be a PS/2, I2C, SPI, WSB, or other bus. The controller 302, sensor 304, keyboard sensor 306, and keyboard 180, may be used to implement various processes, such as the processes described herein.

The keyboard 180 may include multiple keys, including alphanumeric keys (letters and numbers), directional keys (up, down, left, right), modifier keys (control, alter, shift), and/or function keys. The user may strike the keys on the keyboard 180 to actuate corresponding electrical contacts on the keyboard sensor 306. The keyboard sensor 306 may send a signal(s) to the controller 302 indicating the key(s) stricken by the user.

The components of the tactile input device 110, keyboard 180, keyboard sensor 306, controller 302, and their interrelationships, as shown and described with respect to FIG. 3, are merely an example. The functionalities may, for example, be stored and/or included on a non-transitory computer-readable storage medium comprising instructions stored thereon that, when executed by a processor and/or the controller 302, are configured to cause the computing system 100 to perform any combination of the functionalities or processes described herein. Or, the tactile input device 110 and/or controller 302 may be designed as an application specific integrated circuit (ASIC) to perform the functions described herein.

Figure 4A:
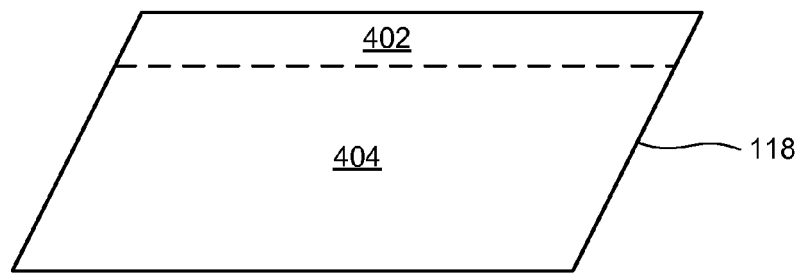
FIG. 4A shows areas of a surface of the tactile input device according to an example implementation.

FIG. 4A shows areas of the surface 118 of the tactile input device 110 according to an example implementation. The surface 118 may include multiple areas, which may be more or less likely to be accidentally touched by a user typing into the keyboard 180 (shown in FIGS. 1, 2, and 3). In this example, the surface 118 may include an upper area 402 and a lower area 404. The upper area 402 may be closer to the keyboard 180. The upper area 402 may, for example, include a top inch, centimeter, or other defined portion f the surface 118. The lower area 404 may be an area of the surface 118 other than the upper area 402, which is not the upper area 402.

The upper area 402 may be considered an accidental area more likely to have been accidentally touched than the lower area 404. For example, a contact with the upper area 402 after and/or before typing may be considered an accidental contact with the tactile input device 110, whereas a contact with the lower area 404 after and/or before typing may be considered an intentional contact with the tactile input device 110. Or, a contact with the upper area 402 may be considered accidental only if preceded and/or followed by a greater number of keystrokes within a given time period, than contact with the lower area 404, according to example implementations.

Figure 4B:
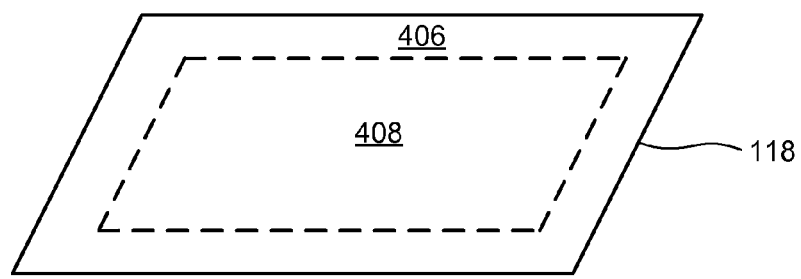
FIG. 4B shows areas of a surface of the tactile input device according to another example implementation.

FIG. 4B shows areas of the surface 118 of the tactile input device 110 according to another example implementation. In this implementation, as in the example described with respect to FIG. 4A, the surface 118 may include multiple areas, which may be more or less likely to be accidentally touched by a user typing into the keyboard 180 (shown in FIGS. 1, 2, and 3). In this example, the surface 118 may include an outer area 406 and an inner area 408. The outer area 406 may include a perimeter, or border a perimeter, of the surface 118. The outer area 406 may include, for example, an outer inch, centimeter, or other defined portion of the surface 118. The inner area 408 may be an area of the surface 118 other than the outer area 406, which is not the outer area 406.

The outer area 406 may be considered an accidental area as a more likely candidate for an accidental touching than the inner area 408. For example, a contact with the outer area 406 after and/or before typing may be considered an accidental contact with the tactile input device 110, whereas a contact with the inner area 408 after and/or before typing may be considered an intentional contact with the tactile input device 110. Or, a contact with the outer area 406 may be considered accidental only if preceded and/or followed by a greater number of keystrokes within a given time period, than contact with the inner area 408, according to example implementations.

Figure 5:
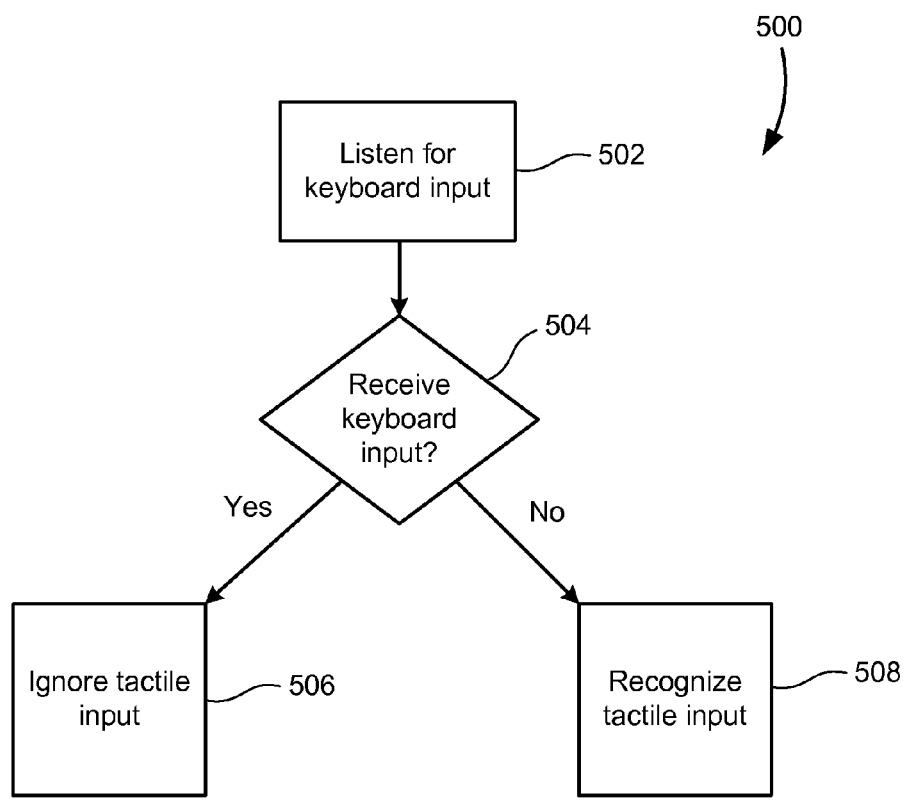
FIG. 5 is a flowchart showing a process performed by the computing device according to an example implementation.

FIG. 5 is a flowchart of a process 500 according to an example implementation. In this example, the computing device 100 may monitor or listen for a keyboard input (502). The computing device 100 may determine whether a keyboard input was received based on the monitoring (504). If the computing device 100 receives a keyboard input, then the computing device 100 may ignore a subsequent tactile input (506). If the computing device 100 does not receive a keyboard input, then the computing device 100 may recognize a subsequent tactile input (508).

Figure 6:
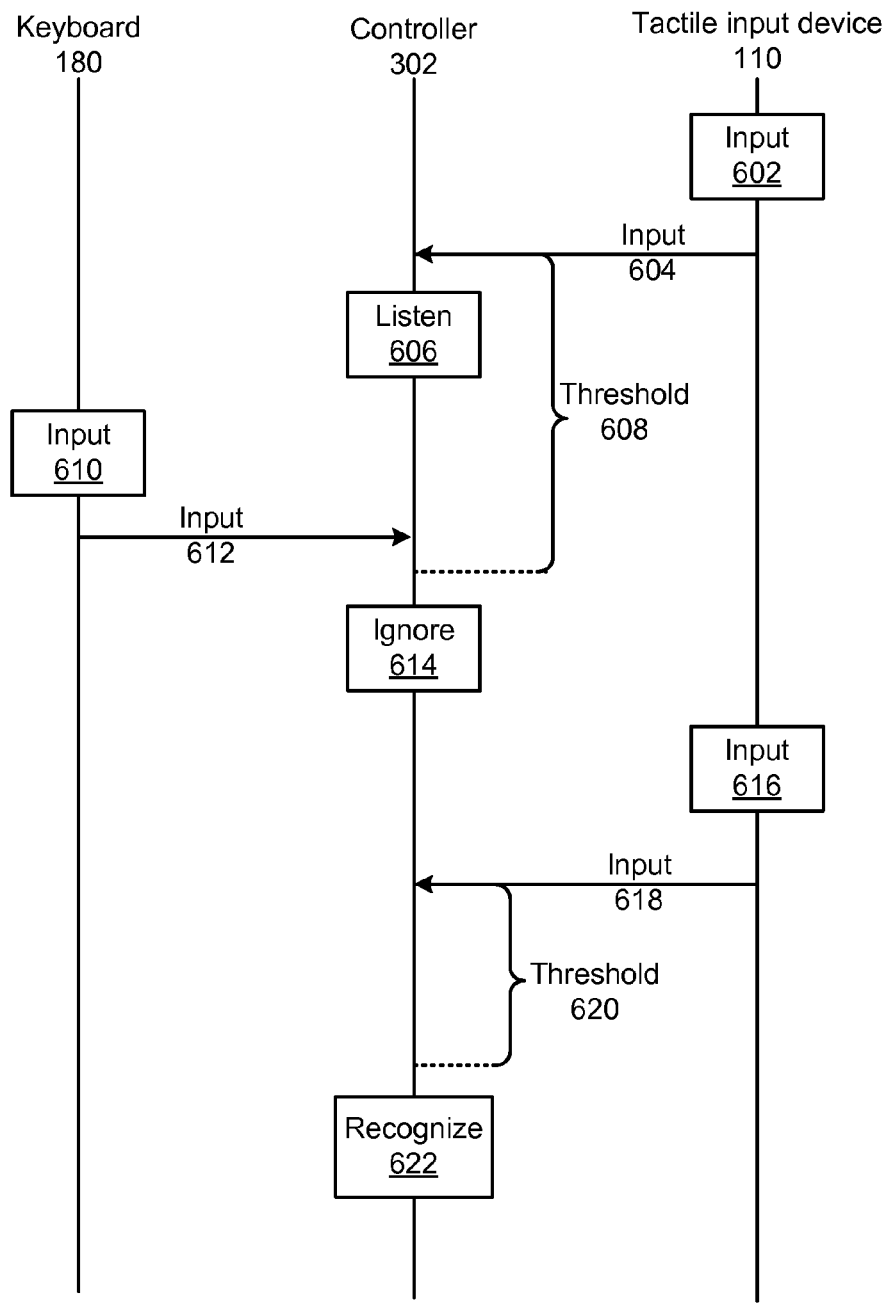
FIG. 6 is a timing diagram showing actions performed by the keyboard, the tactile input device, and a controller of the computing device according to the example shown and described with respect to FIG. 5.

FIG. 6 is a timing diagram showing processes performed by components of the computing device 100, including the keyboard 180, the tactile input device 110, and the controller 302, in accordance with the example shown and described with respect to FIG. 5. The tactile input device 110 may receive an input 602. The tactile input device 110 may, for example, receive a brush, swipe, tap, or other contact from the user. The tactile input device 110 may send an input message 604 to the controller 302 reporting the input 602. Based on receiving the input message 604, the controller 302 may monitor or listen (606) for a keyboard input for a threshold period of time 608. The controller 302 may monitor for the threshold period of time 608 to determine whether an input is received from the keyboard 180.

In this example, the keyboard 180 may receive an input 610 during the threshold period of time 608. The input 610 may, for example, include keystrokes typed into the keyboard 180. The keyboard 180 may respond to receiving the input 610 by sending an input message 612 to the controller 302 reporting the input 610. Based on receiving the input message 612 within the threshold period of time 608, the controller 302 may ignore the tactile input 604 (614) as likely resulting from accidental contact with the tactile input device 110.

The tactile input device 110 may receive an input 616. The tactile input device 110 may send an input message 618 to the controller 302 reporting the input 616. The controller 302 may wait a threshold period of time 620 (which may be the same as the threshold period of time 608) to determine whether a keyboard input is received. In this example, no keyboard input is received within the threshold period of time 620. Based on not receiving any input from the keyboard 180 within the threshold period of time 620, the controller 302 may recognize the tactile input (622).

Figure 7:
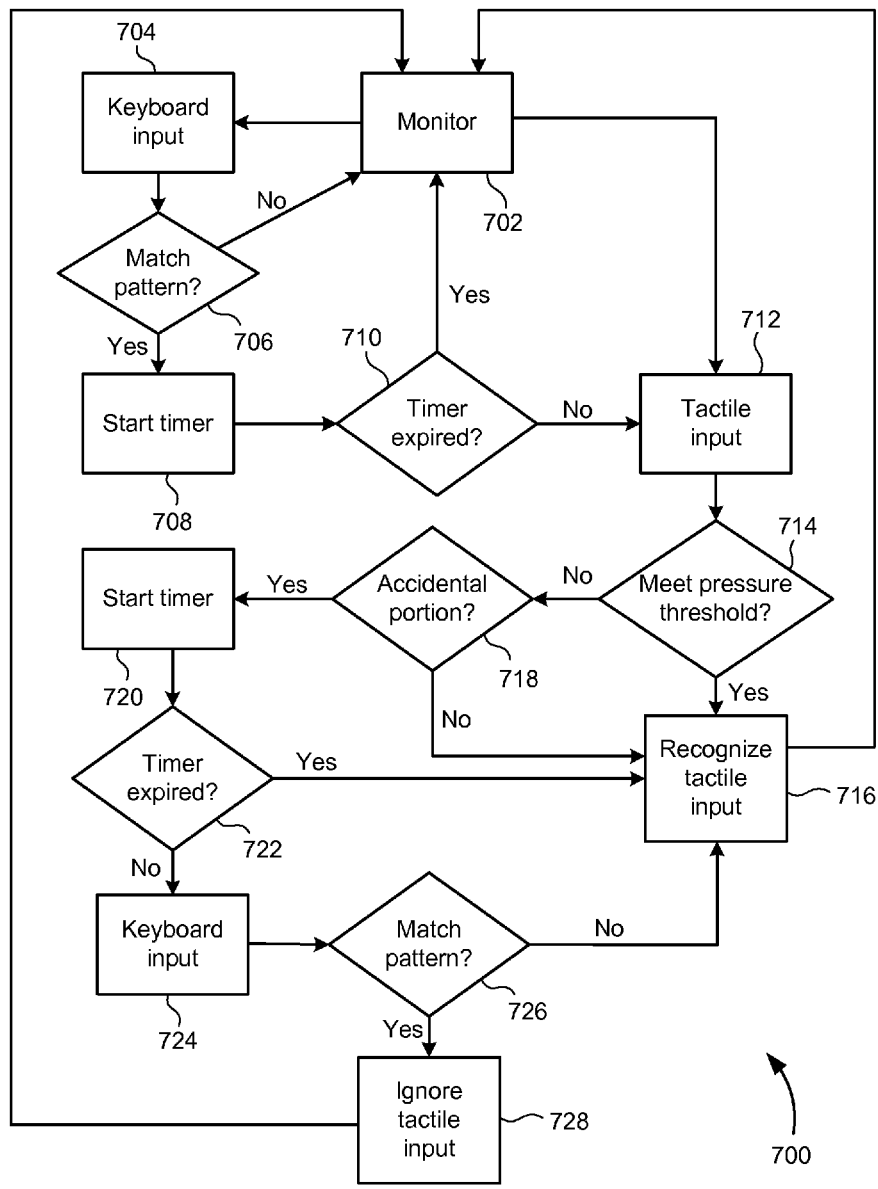
FIG. 7 is a flowchart showing a process performed by the computing device according to an example implementation.

FIG. 7 is a flowchart of a process 700 performed by the computing device 100 according to an example embodiment. The computing device 100 may monitor or listen for input (702). If the computing device 100 receives keyboard input (704), then the computing device 100 may determine whether the keyboard input matches a predetermined pattern (706). The predetermined pattern may, for example, include particular keys on the keyboard, a certain speed of typing within a certain period of time, or a certain style of typing associated with the user or users in general. The predetermined pattern may be stored in a memory device accessible by the controller 302, or may be stored in the controller 302 itself. If the predetermined pattern is stored in a memory device outside the controller 302, the controller 302 may retrieve or read the predetermined pattern from the memory device. The controller 302 may, for example, temporarily store the keyboard input, and compare the keyboard input to the stored predetermined pattern to determine whether the keyboard input matches the predetermined pattern. If the keyboard input does not match the predetermined pattern, then the computing device 100 may continue to monitor or listen for input (702).

If the keyboard input does match the predetermined pattern, then the computing device 100 may start a timer (708). The timer may be used to determine whether a subsequent tactile input is received within a predetermined time or within a threshold period of time from when the keyboard input was received, or the computing device 100 may update or store a time of last input into the keyboard 180, which may later be checked when a tactile input device input is received. The time of last input from the keyboard 180 may be checked against the current time to see whether the tactile input device input was received within the threshold period of time after the keyboard input, achieving a similar result as starting a timer.

After the timer has been started (708), the computing device 100 may determine whether the timer has expired (710). If the timer has expired without receiving tactile input device input, then the computing device 100 may continue to monitor or listen for input (702). If the timer has not expired, then the computing device 100 may receive tactile input (712) within the time allowed by the timer. The computing device 100 may also receive the tactile input (712) without first receiving the keyboard input (704) and perform similar functions described herein. Or, the computing device 100 may perform the functions described herein only if the keyboard input (704) is received within a predetermined time or a threshold period of time after receiving the tactile input (712).

After receiving the tactile input (712), the computing device 100 may determine whether the tactile input meets a pressure threshold (714). The pressure threshold (714) may be required to determine whether the contact with the tactile input device 110 was accidental or intentional. If the pressure threshold was met, then the computing device 100 may recognize the contact as a tactile input (716) and thereafter continue to monitor or listen for input (702).

If the tactile input did not meet the pressure threshold, then the computing device 100 may determine whether the contact with the tactile input device 110 was within an accidental portion, such as an upper portion 402 described with respect to FIG. 4A or an outer portion 406 shown and described with respect to FIG. 4B (718). If the contact was not within the accidental portion, then the computing device 100 may recognize the tactile input (716). If the tactile input was received within an accidental portion, then the computing device 100 may start a timer (720). The timer may have the same or different time as described with respect to starting the timer (708) after the first keyboard input.

Alternatively, the computing device 100 may update or store a time of last receiving the tactile input and compare the time of last receiving the tactile input to a current time to determine whether a later keyboard input was received within a threshold time from the tactile input. The computing device 100 may thereafter determine whether the timer has expired without receiving a keyboard input (722). If the timer has expired without receiving a keyboard input, then the computing device 100 may recognize the tactile input (716). If the timer has not expired by the time the computing device 100 receives a keyboard input (724), then the computing device 100 may determine whether the keyboard input (724) matches a predetermined pattern (726). The predetermined pattern may, for example, include particular keys on the keyboard 180, a speed of typing with a number of keystrokes typed within a threshold period of time, or a pattern of typing associated with a particular user or users in general. The predetermined pattern against which the keyboard input (724) is compared (726) may be stored, compared, and/or accessed in a similar manner to the predetermined pattern against which the keyboard input (704) is compared. The predetermined pattern for keyboard input (724) received after the tactile input (712), which may be considered a post-tactile typing pattern, may be the same or different from the predetermined pattern for keyboard input (704) received before the tactile input (712), the latter of which may be considered a pre-tactile typing pattern.

If the keyboard input (724) does not match the pattern, then the computing device 100 may recognize the tactile input (716). After recognizing the tactile input (716), the computing device 100 may continue to monitor or listen for input (702). If the keyboard input (724) does match the pattern, then the computing device 100 may ignore the tactile input (728) and thereafter monitor or listen (702) for further input.

Figure 8:
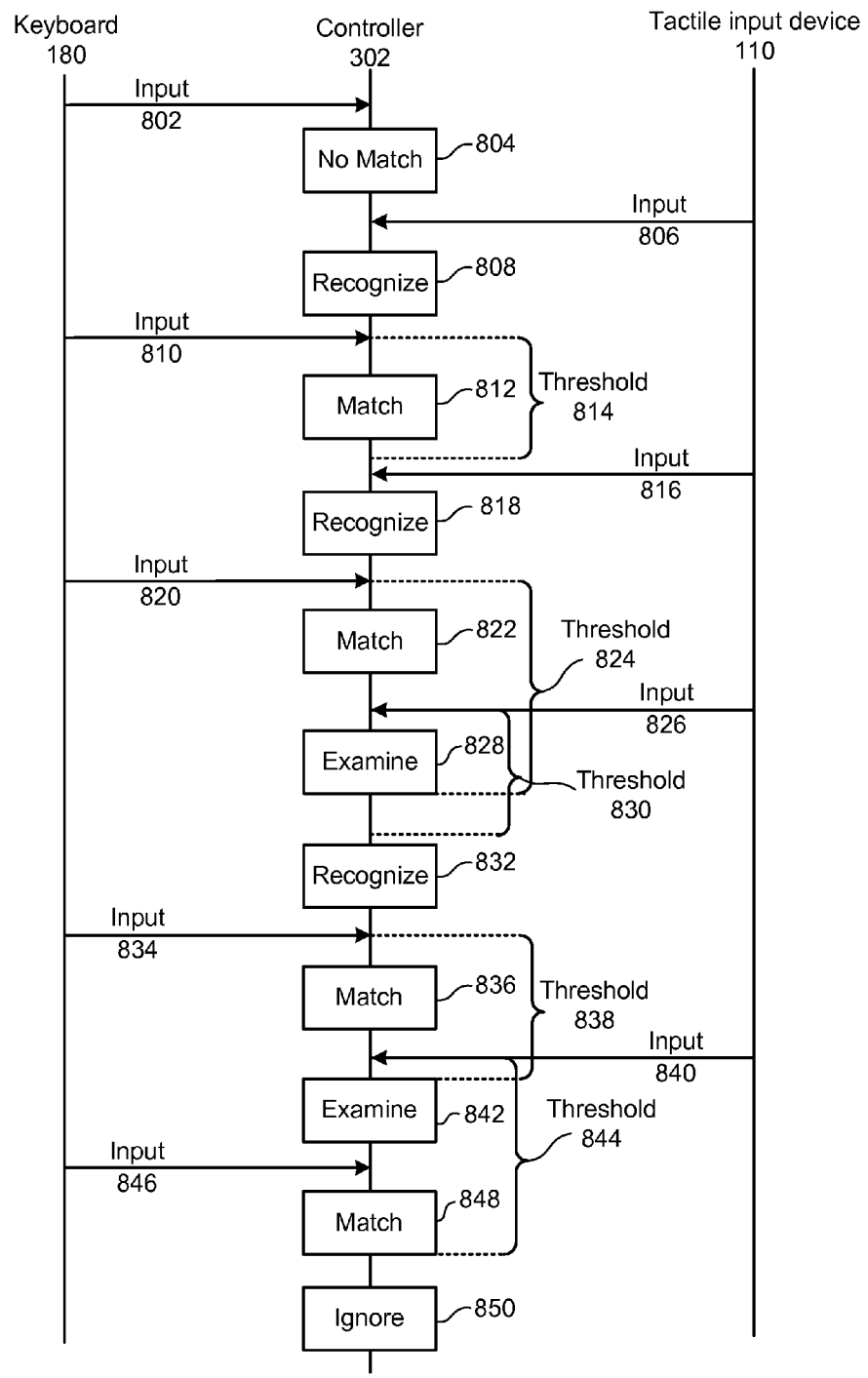
FIG. 8 is a timing diagram showing actions performed by the keyboard, the tactile input device, and the controller according to the example shown and described with respect to FIG. 7.

FIG. 8 is a timing diagram showing processes performed and messages sent between components of the computing device 100, including the keyboard 180, the tactile input device 110, and the controller 302, according to the example shown and described with respect to FIG. 7.

In this example, the keyboard 180 may receive input and send a corresponding keyboard input message 802 to the controller 302. In this example, the controller 302 determines that the keyboard input does not match a predetermined pattern (804). The tactile input device 110 may subsequently receive an input and send a tactile input message 806 to the controller 302. Based on the previous keyboard input 802 not matching the predetermined pattern, the controller 302 may recognize the tactile input (808).

The keyboard 180 may receive an input and send a keyboard input message 810 to the controller 302. In this example, the keyboard input 810 may match a predetermined pattern. The controller 302 may determine that the keyboard input 810 matches a predetermined pattern (812). Based on the keyboard input 810 matching the predetermined pattern, the controller 302 may determine whether a subsequent tactile input device input is received within a threshold period of time 814.

In this example, the tactile input device 110 receives an input and sends a tactile input message 816 to the controller 302 after the expiration of the threshold period of time 814 after receiving the keyboard input 810. Based on the tactile input device input 816 being received after the expiration of the threshold period of time 814, the controller 302 may recognize the tactile input 816 (818).

The keyboard 180 may receive input and send a keyboard input message 820 to the controller 302. In this example, the controller 302 may determine that the input message 820 matches a predetermined typing pattern (822). Based on the input message 820 matching the predetermined typing pattern, the controller 302 may determine whether a subsequent tactile input is received within a threshold period of time 824. In this example, the tactile input device 110 receives an input and sends a tactile input message 826 to the controller 302 within the threshold period of time 824. Based on the tactile input message 826 being received within the threshold period of time 824, the controller 302 may examine the tactile input 826 (828). The controller 302 may examine the input (828) by, for example, determining whether the tactile input meets a pressure threshold and/or whether the tactile input was received within an accidental portion of the tactile input device 110. In this example, the controller 302 determines that the tactile input device input is a candidate for an accidental contact, and determines whether a keyboard input is received within a threshold period of time 830. In this example, no keyboard input is received within the threshold period of time 830, and the controller recognizes the keyboard input (832).

The keyboard 180 may receive an input and send a keyboard input message 834 to the controller 302. In this example, the controller 302 may determine that the keyboard input 834 matches a predetermined pattern (836), and based on the keyboard input 834 matching the predetermined pattern, determine whether a tactile input is received within a threshold period of time 838. The tactile input device 110 may receive a tactile input and send a tactile input message 840 to the controller 302 within the threshold period of time 838. Based on the controller receiving the tactile input message 840 within the threshold period of time 838, the controller 302 may examine the tactile input message 838 (842). The controller 302 may, for example, determine whether the tactile input met a pressure threshold and/or whether the tactile input was received within an accidental portion of the tactile input device 110.

In this example, the controller 302 determines that the tactile input is a candidate for an accidental input and determines whether a subsequent keyboard input is received within a threshold period of time 844. The keyboard 180 subsequently receives an input and sends a keyboard input message 846 to the controller 302. The controller 302 may determine that the keyboard input message 846 matches a predetermined typing pattern (848) based on a speed of typing, particular keys typed and/or matching a pattern associated with the user or users in general. Based on the tactile input message 840 being received within the threshold period of time 838 of the keyboard input message 834 and the keyboard input message 846 being received within the threshold period of time 844 of the tactile input message 840, the controller 302 may ignore the tactile input associated with the tactile input message 840 (850).

Figure 9:
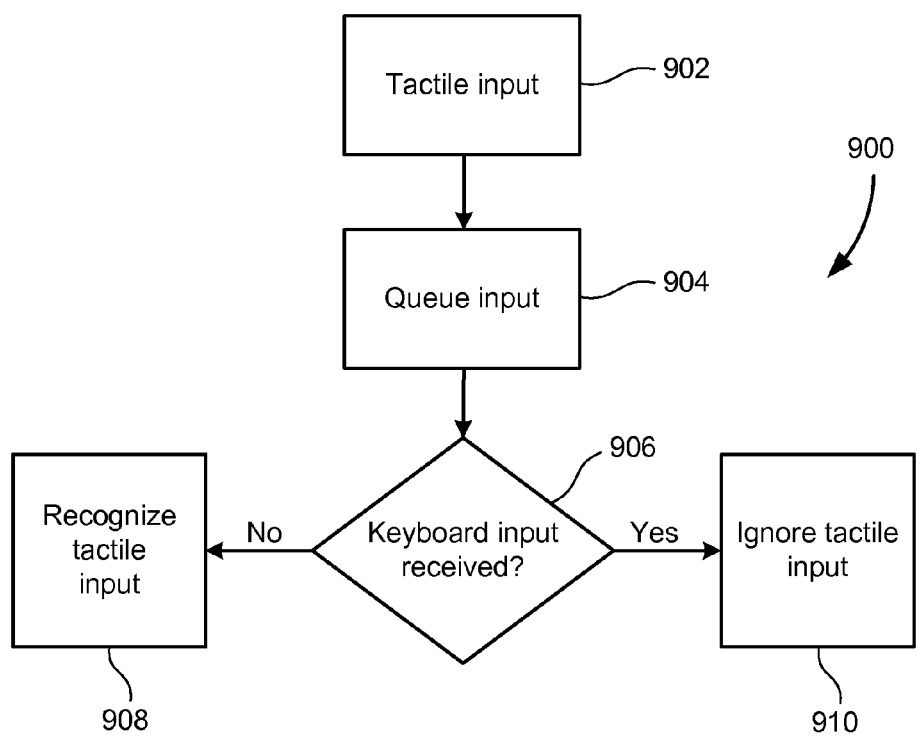
FIG. 9 is a flowchart showing a process performed by the computing device according to an example implementation.

FIG. 9 is an example of a process performed by the computing device 100 according to an example implementation. In this example, the computing device 100 may receive a tactile input (902). Based on receiving the tactile input, the computing device 100 may queue the input (904). The computing device 100 may queue the input for a predetermined period of time to determine whether a keyboard input is received within the predetermined period of time (906). The computing device 100 may queue the input (904) by storing the input (902) in a temporary buffer. The temporary buffer may include registers or cache included on the controller 302, or a memory accessible to the controller 302, according to example implementations. If a keyboard input is not received within the predetermined period of time, then the computing device 100 may recognize the tactile input (908). If the keyboard input is received within the predetermined period of time, then the computing device 100 may ignore the tactile input (910). If the computing device 100 ignores the tactile input (910), then the computing device 100 may also erase the queued input from the temporary buffer.

Figure 10:
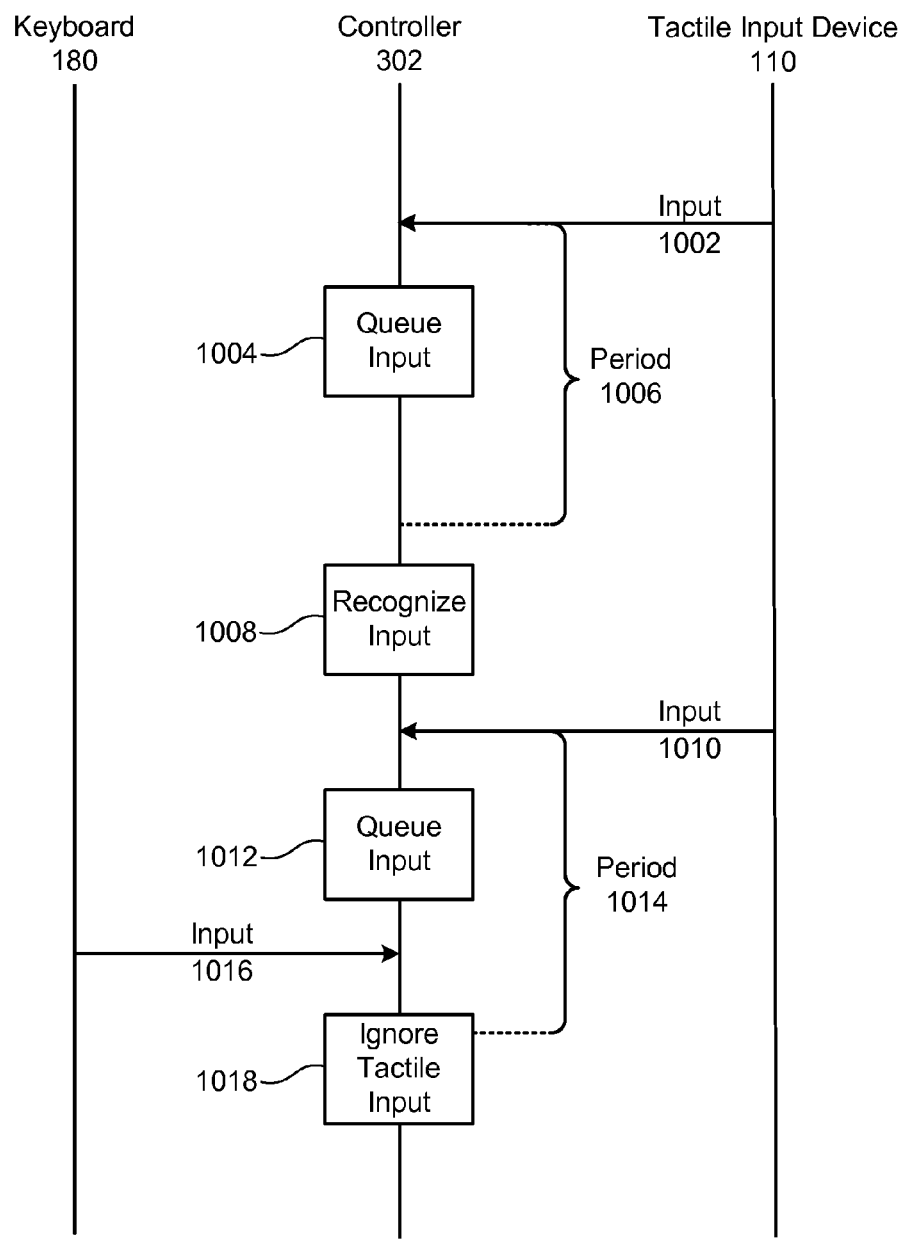
FIG. 10 is a timing diagram showing actions performed by the keyboard, the tactile input device, and the controller according to the example shown and described with respect to FIG. 9.

FIG. 10 is a timing diagram showing actions performed and messages sent between components of the computing device 100, including the keyboard 180, the tactile input device 110, and the controller 302 according to the example shown and described with respect to FIG. 9. In this example, the tactile input device 110 may receive a tactile input and send a tactile input message 1002 to the controller 302. The controller 302 may queue the input (1004) for a predetermined period of time 1006. In this example, no keyboard input is received within the predetermined period 1006, so the controller 302 recognizes the queued input (1008).

The tactile input device 110 may receive a tactile input and send a corresponding tactile input message 1010 to the controller 302. Based on receiving the tactile input message 1010, the controller 302 may queue the tactile input (1012) for the predetermined period of time 1014. The controller 302 may queue the tactile input to determine whether a keyboard input is received within the predetermined period of time 1014. In this example, the keyboard 180 receives a keyboard input and sends a corresponding keyboard input message 1016 to the controller 302 within the predetermined period of time 1014. Based on receiving the keyboard input message 1016 within the predetermined period of time 1014 after receiving the tactile input message 1010, the controller 302 may ignore the queued tactile input (1018).

Figure 11:
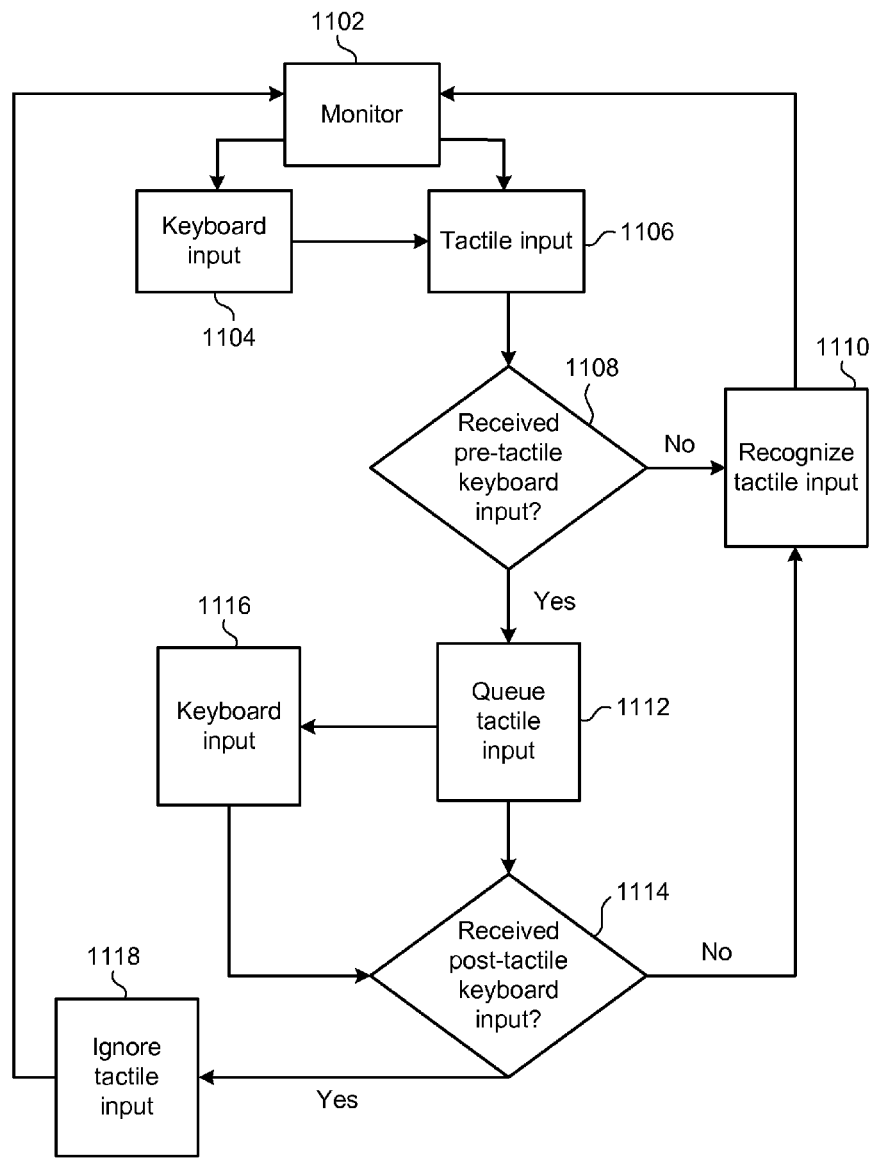
FIG. 11 is a flowchart showing a process performed by the computing device according to an example implementation.

FIG. 11 is a flowchart of a process performed by the computing device 100 according to an example embodiment. In this example, the computing device 100 may monitor or listen for input from either the keyboard 180 or the tactile input device 110 (1102). The computing device 100 may receive tactile input (1106) and/or keyboard input (1104). The computing device 100 may perform the processes described herein based on receiving only the tactile input (1106) or based on receiving the tactile input (1106) after receiving the keyboard input (1104). After receiving the tactile input (1106), the computing device 100 may determine whether it has received pre-tactile keyboard input, such as the keyboard input (1104) (1108). If the computing device 100 has not received pre-tactile keyboard input, then the computing device 100 may recognize the tactile input (1110).

If the computing device 100 has received pre-tactile keyboard input, then the computing device may queue the tactile input (1112). The computing device 100 may queue the tactile input for the predetermined period of time to determine whether keyboard input is received within the predetermined period of time after receiving the tactile input. After the predetermined period of time, the computing device 100 may determine whether it has received post-tactile keyboard input within the predetermined period of time (1114). If the computing device did receive keyboard input (1116) within the predetermined period of time after receiving the tactile input (1106), then the computing device 100 may ignore the tactile input (1118). If the computing device 100 did not receive post-tactile keyboard input within the predetermined period of time after receiving the tactile input, then the computing device 100 may recognize the tactile input (1110). After either recognizing (1110) or ignoring (1118) the tactile input, the computing device may continue to monitor or listen for input (1102).

Figure 12:
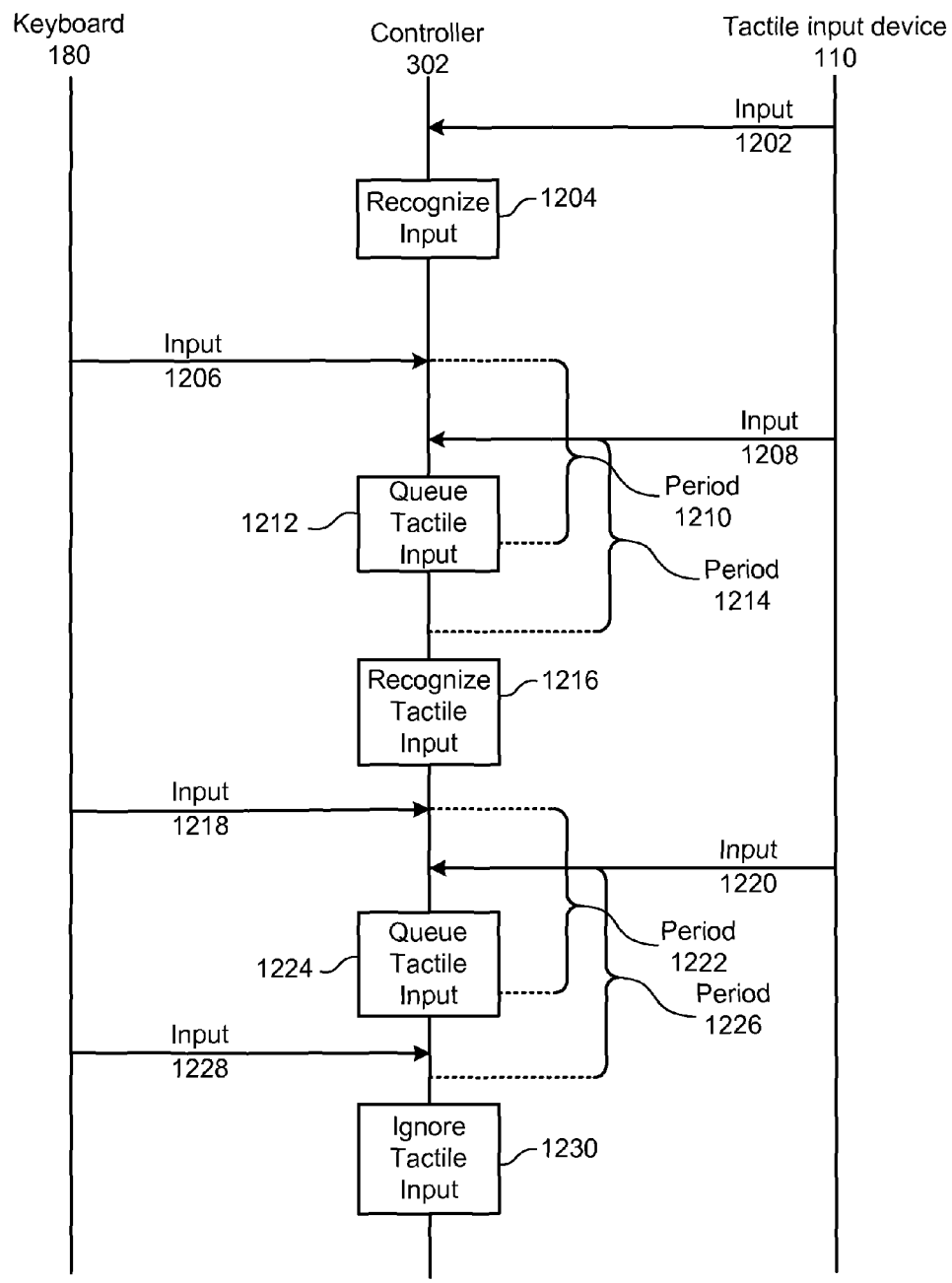
FIG. 12 is a timing diagram showing actions performed by the keyboard, the tactile input device, and the controller according to the example shown and described with respect to FIG. 11.

FIG. 12 is a timing diagram showing processes performed and messages sent between components of the computing device 100, including the keyboard 180, the tactile input device 110, and the controller 302 according to the example shown and described with respect to FIG. 11. In this example, the tactile input device 110 may receive an input and send a corresponding tactile input message 1202 to the controller 302. Based on not having received any pre-tactile keyboard input before the tactile input, the controller 302 may recognize the tactile input (1204).

The keyboard 180 may receive pre-tactile keyboard input and send a keyboard input message 1206 to the controller 302. If the tactile input device 110 receives a tactile input and sends a tactile input message 1208 to the controller 302 within a predetermined period of time 1210 after the pre-tactile keyboard input 1206 was received, then the controller 302 may queue the tactile input (1212). The controller 302 may queue the tactile input for a predetermined period of time 1214. The predetermined period of time 1214 may be the same or different than the predetermined period of time 1210 after the pre-tactile keyboard input 1206 for which the controller 302 waits to determine whether a post-tactile keyboard input was received.

In this example, the keyboard 180 did not receive a post-tactile keyboard input and send the keyboard input message to the controller 302 within the predetermined period of time 1214 after the tactile input was received. Based on the controller 302 not receiving a keyboard input message within the predetermined period of time 1214 after receiving the tactile input message 1208, the controller 302 recognizes the queued tactile input (1216).

The keyboard 180 may receive a pre-tactile keyboard input and send a corresponding keyboard input message 1218 to the controller 302. The controller 302 may determine whether a tactile input is received within a predetermined period of time 1222. The tactile input device 110 may thereafter receive a tactile input and send a tactile input message 1220 to the controller 302. The controller 302 may determine that the tactile input message 1220 was received within the predetermined period of time 1222 after the keyboard input message 1218. Based on receiving the tactile input message 1220 within the predetermined period of time 1222 after the keyboard input message 1218, the controller 302 may queue the tactile input (1224). The controller 302 may queue the tactile input for a predetermined period of time 1226. The predetermined period of time 1226 during which the controller 302 queues the tactile input may be the same or different than the predetermined period of time 1222 during which the controller 302 determines whether a tactile input is received after a pre-tactile keyboard input 180.

The keyboard 180 may thereafter receive a post-tactile keyboard input and send a corresponding keyboard input message 1228 to the controller 302. In this example, the post-tactile keyboard input is received and/or the keyboard input message 1228 is received within the threshold period of time 1226 during which the tactile input is queued after receiving the tactile input and/or tactile input message 1220. Based on receiving the tactile input 1220 within the threshold period of time 1222 after the pre-tactile keyboard input 1218 and receiving the post-tactile keyboard input 1228 within the threshold period of time 1226 after the tactile input 1220, the controller 302 may ignore the tactile input (1230).

FIG. 13 shows an example of a generic computer device 1300 and a generic mobile computer device 1350, which may be used with the techniques described here. Computing device 1300 is intended to represent various forms of digital computers, such as laptops, desktops, workstations, personal digital assistants, servers, blade servers, mainframes, and other appropriate computers. Computing device 1350 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1300 includes a processor 1302, memory 1304, a storage device 1306, a high-speed interface 1308 connecting to memory 1304 and high-speed expansion ports 1310, and a low speed interface 1312 connecting to low speed bus 1314 and storage device 1306. Each of the components 1302, 1304, 1306, 1308, 1310, and 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as display 1316 coupled to high speed interface 1308. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1304 stores information within the computing device 1300. In one implementation, the memory 1304 is a volatile memory unit or units. In another implementation, the memory 1304 is a non-volatile memory unit or units. The memory 1304 may also be another form of computer-readable medium, such as a magnetic or optical disk.

The storage device 1306 is capable of providing mass storage for the computing device 1300. In one implementation, the storage device 1306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1304, the storage device 1306, or memory on processor 1302.

The high speed controller 1308 manages bandwidth-intensive operations for the computing device 1300, while the low speed controller 1312 manages lower bandwidth-intensive operations. Such allocation of functions is exemplary only. In one implementation, the high-speed controller 1308 is coupled to memory 1304, display 1316 (e.g., through a graphics processor or accelerator), and to high-speed expansion ports 1310, which may accept various expansion cards (not shown). In the implementation, low-speed controller 1312 is coupled to storage device 1306 and low-speed expansion port 1314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. It may also be implemented as part of a rack server system 1324. In addition, it may be implemented in a personal computer such as a laptop computer 1322. Alternatively, components from computing device 1300 may be combined with other components in a mobile device (not shown), such as device 1350. Each of such devices may contain one or more of computing device 1300, 1350, and an entire system may be made up of multiple computing devices 1300, 1350 communicating with each other.

Computing device 1350 includes a processor 1352, memory 1364, an input/output device such as a display 1354, a communication interface 1366, and a transceiver 1368, among other components. The device 1350 may also be provided with a storage device, such as a microdrive or other device, to provide additional storage. Each of the components 1350, 1352, 1364, 1354, 1366, and 1368, are interconnected using various buses, and several of the components may be mounted on a common motherboard or in other manners as appropriate.

The processor 1352 can execute instructions within the computing device 1350, including instructions stored in the memory 1364. The processor may be implemented as a chipset of chips that include separate and multiple analog and digital processors. The processor may provide, for example, for coordination of the other components of the device 1350, such as control of user interfaces, applications run by device 1350, and wireless communication by device 1350.

Processor 1352 may communicate with a user through control interface 1358 and display interface 1356 coupled to a display 1354. The display 1354 may be, for example, a TFT LCD (Thin-Film-Transistor Liquid Crystal Display) or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may be provide in communication with processor 1352, so as to enable near area communication of device 1350 with other devices. External interface 1362 may provide, for example, for wired communication in some implementations, or for wireless communication in other implementations, and multiple interfaces may also be used.

The memory 1364 stores information within the computing device 1350. The memory 1364 can be implemented as one or more of a computer-readable medium or media, a volatile memory unit or units, or a non-volatile memory unit or units. Expansion memory 1374 may also be provided and connected to device 1350 through expansion interface 1372, which may include, for example, a SIMM (Single In Line Memory Module) card interface. Such expansion memory 1374 may provide extra storage space for device 1350, or may also store applications or other information for device 1350. Specifically, expansion memory 1374 may include instructions to carry out or supplement the processes described above, and may include secure information also. Thus, for example, expansion memory 1374 may be provide as a security module for device 1350, and may be programmed with instructions that permit secure use of device 1350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1374, or memory on processor 1352, that may be received, for example, over transceiver 1368 or external interface 1362.

Device 1350 may communicate wirelessly through communication interface 1366, which may include digital signal processing circuitry where necessary. Communication interface 1366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1368. In addition, short-range communication may occur, such as using a Bluetooth, WiFi, or other such transceiver (not shown). In addition, GPS (Global Positioning System) receiver module 1370 may provide additional navigation- and location-related wireless data to device 1350, which may be used as appropriate by applications running on device 1350.

Device 1350 may also communicate audibly using audio codec 1360, which may receive spoken information from a user and convert it to usable digital information. Audio codec 1360 may likewise generate audible sound for a user, such as through a speaker, e.g., in a handset of device 1350. Such sound may include sound from voice telephone calls, may include recorded sound (e.g., voice messages, music files, etc.) and may also include sound generated by applications operating on device 1350.

The computing device 1350 may be implemented in a number of different forms, as shown in the figure. For example, it may be implemented as a cellular telephone 1380. It may also be implemented as part of a smart phone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon that, when executed by at least one processor, are configured to cause a computer system to at least:

determine whether a pre-tactile keyboard input was received within a pre-tactile input threshold time before receiving a tactile input device input;
monitor for a post-tactile keyboard input within a post-tactile input threshold time after receiving the tactile input device input;
ignore the tactile input device input if:
   the pre-tactile keyboard input is received within the pre-tactile input threshold time before receiving the tactile input device input; and
   the post-tactile keyboard input is received within the post-tactile input threshold time after receiving the tactile input device input; and
recognize the tactile input device input if:
   the pre-tactile keyboard input is not received within the pre-tactile input threshold time before receiving the tactile input device input; or
   the post-tactile keyboard input is not received within the post-tactile input threshold time after receiving the tactile input device input.

2. The non-transitory computer-readable storage medium of claim 1, wherein the tactile input device input is received from a trackpad or a touchpad.

3. The non-transitory computer-readable storage medium of claim 1, wherein the tactile input device input is received from a touchscreen.

4. The non-transitory computer-readable storage medium of claim 1, wherein recognizing the tactile input device input includes recognizing a mouse move gesture.

5. The non-transitory computer-readable storage medium of claim 1, wherein the post-tactile keyboard input includes a predetermined number of keystrokes.

6. The non-transitory computer-readable storage medium of claim 1, wherein the post-tactile keyboard input includes a predetermined number of keystrokes, the predetermined number being greater than one.

7. The non-transitory computer-readable storage medium of claim 1, wherein the post-tactile keyboard input includes a post-tactile typing pattern matching a stored typing pattern associated with a user.

8. The non-transitory computer-readable storage medium of claim 1, wherein:
the ignoring the tactile input device input comprises ignoring the tactile input device input if:
   the pre-tactile keyboard input is received within the pre-tactile input threshold time before receiving the tactile input device input; and
   the post-tactile keyboard input is received within the post-tactile input threshold time after receiving the tactile input device input; and
   the tactile input device input was received inside an accidental portion of the tactile input device; and
the recognizing the tactile input device input comprises recognizing the tactile input device input if:
   the pre-tactile keyboard input is not received within the pre-tactile input threshold time before receiving the tactile input device input; or
   the post-tactile keyboard input is not received within the post-tactile input threshold time after receiving the tactile input device input; or
   the tactile input device input was received outside an accidental portion of the tactile input device.

9. The non-transitory computer-readable storage medium of claim 1, wherein:
the ignoring the tactile input device input comprises ignoring the tactile input device input if:

the pre-tactile keyboard input is received within the pre-tactile input threshold time before receiving the tactile input device input; and the post-tactile keyboard input is received within the post-tactile input threshold time after receiving the tactile input device input; and a pressure associated with the tactile input device input does not meet a tactile input pressure threshold; and the recognizing the tactile input device input comprises recognizing the tactile input device input if:

the pre-tactile keyboard input is not received within the pre-tactile input threshold time before receiving the tactile input device input; or the post-tactile keyboard input is not received within the post-tactile input threshold time after receiving the tactile input device input; or the pressure associated with the tactile input device input does meet the tactile input pressure threshold.

10. The non-transitory computer-readable storage medium of claim 1, wherein the pre-tactile keyboard input matches a stored typing pattern associated with a user.

11. The non-transitory computer-readable storage medium of claim 1, wherein:

the pre-tactile keyboard input matches a stored pre-tactile typing pattern associated with a user; and the post-tactile keyboard input matches a stored post-tactile typing pattern associated with the user.

12. The non-transitory computer-readable storage medium of claim 1, further configured to cause the computer system to:

queue the tactile input device input, wherein the monitoring includes monitoring for the post-tactile keyboard input within the post-tactile input threshold time after receiving the tactile input device input while the tactile input device input is queued, and wherein the recognizing the tactile input device input includes recognizing the queued tactile input device input.

13. A non-transitory computer-readable storage medium comprising instructions stored thereon that, when executed by at least one processor, cause a computing device to at least:

receive a pre-tactile keyboard input before receiving input from a tactile input device;

receive input from the tactile input device;

queue the input from the tactile input device for a post-tactile input threshold time after receiving the input from the tactile input device based on receiving the pre-tactile keyboard input;

determine whether a post-tactile keyboard input is received within a predetermined period of time after receiving the input from the tactile input device;

if the pre-tactile keyboard input is received before receiving the input from the tactile input device and the post-tactile keyboard input is received within the post-tactile input threshold time after receiving the input from the tactile input device, ignore the queued input from the tactile input device; and if no post-tactile keyboard input is received within the post-tactile input threshold time after receiving the input from the tactile input device, recognize the queued tactile input device input.

14. A computer system comprising:
a keyboard configured to receive keyboard input;
a tactile input device configured to receive tactile input; and
a controller configured to:
determine whether a pre-tactile keyboard input was received within a pre-tactile input threshold time before receiving a tactile input device input;
monitor for a post-tactile keyboard input into the keyboard within a post-tactile input threshold time after receiving the tactile input device input into the tactile input device;
ignore the tactile input device input if:
the pre-tactile keyboard input is received within the pre-tactile input threshold time before receiving the tactile input device input; and
the post-tactile keyboard input is received within the post-tactile input threshold time after receiving the tactile input device input; and
recognize the tactile input device input if:
the pre-tactile keyboard input is not received within the pre-tactile input threshold time before receiving the tactile input device input; or
the keyboard input is not received within the post-tactile input threshold time after receiving the tactile input device input.

15. The computer system of claim 14, wherein the post-tactile keyboard input includes a predetermined number of keystrokes, the predetermined number being greater than one.

16. The computer system of claim 14, wherein:
the ignoring the tactile input device input comprises ignoring the tactile input device input if:
the pre-tactile keyboard input is received within the pre-tactile input threshold time before receiving the tactile input device input; and
the keyboard input is received within the post-tactile input threshold time after receiving the tactile input device input; and
the tactile input device input was received inside an accidental portion of the tactile input device; and
the recognizing the tactile input device input comprises recognizing the tactile input device input if:
the pre-tactile keyboard input is not received within the pre-tactile input threshold time before receiving the tactile input device input; or
the keyboard input is not received within the post-tactile input threshold time after receiving the tactile input device input; or
the tactile input device input was received outside an accidental portion of the tactile input device.

17. The computer system of claim 14, wherein:
the ignoring the tactile input device input comprises ignoring the tactile input device input if:
the pre-tactile keyboard input is received within the pre-tactile input threshold time before receiving the tactile input device input; and
the keyboard input is received within the post-tactile input threshold time after receiving the tactile input device input; and
a pressure associated with the tactile input device input does not meet a tactile input pressure threshold; and
the recognizing the tactile input device input comprises recognizing the tactile input device input if:
the pre-tactile keyboard input is not received within the pre-tactile input threshold time before receiving the tactile input device input; or
the keyboard input is not received within the post-tactile input threshold time after receiving the tactile input device input; or the pressure associated with the tactile input device input does meet the tactile input pressure threshold.

* * * * *